Patented Apr. 3, 1928.

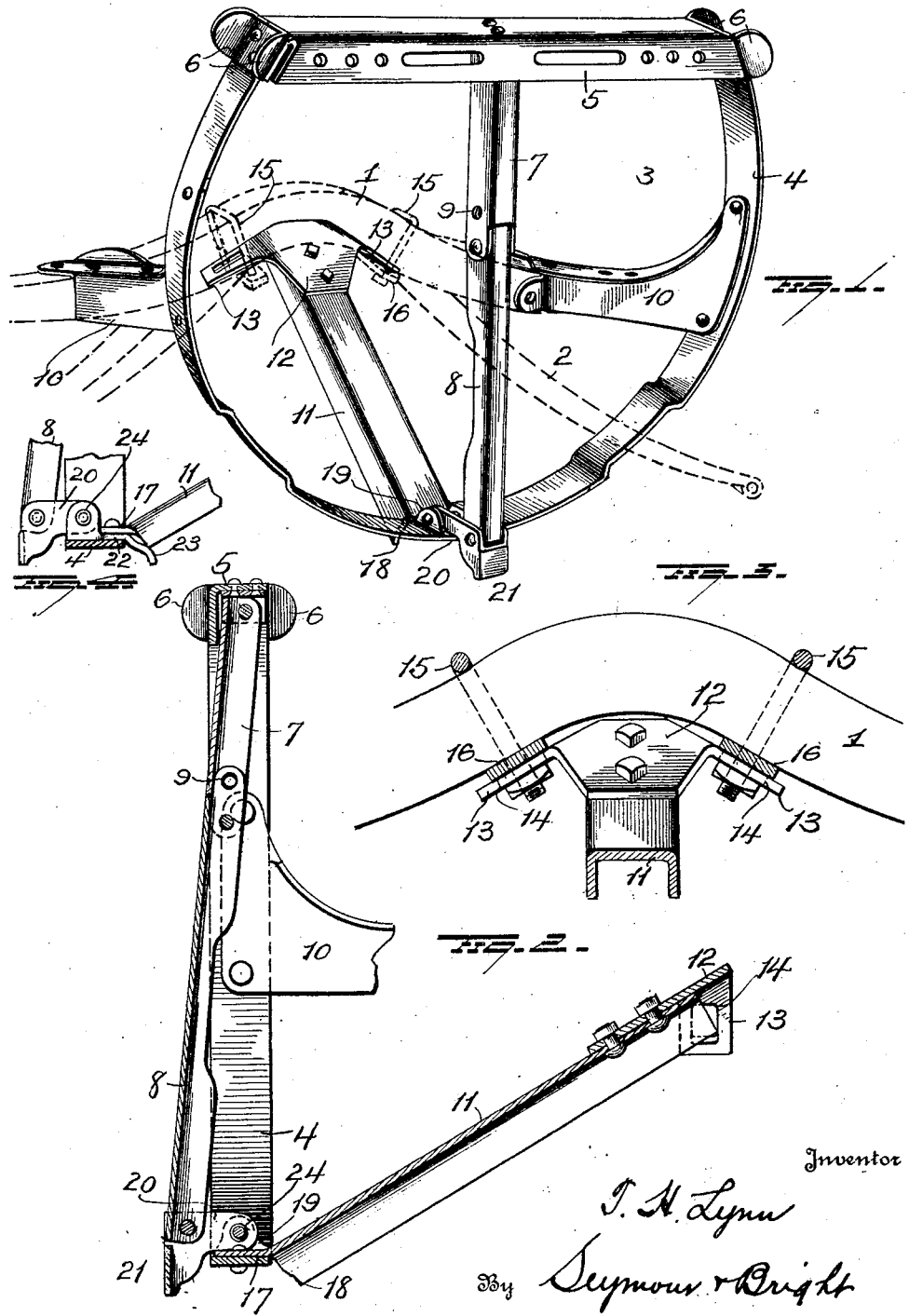

1,664,754

UNITED STATES PATENT OFFICE.

THOMAS H. LYNN, OF WILLIAMSPORT, PENNSYLVANIA.

TIRE CARRIER.

Application filed April 11, 1922. Serial No. 551,508.

This invention relates to improvements in tire carriers and more particularly to attaching or supporting means for the same,—one object of the invention being to provide simple and efficient means for connecting a tire carrier with the rear portion of an automobile in such manner as to provide a rigid support for the tire carrier and reduce to a minimum the transmission of vibration incident to the running of the car, to the tire carrier.

A further object is to so construct supporting or attaching means for a tire carrier, that a portion of said means shall be utilized in the construction of the carrier.

With these and other objects in view, the invention consists in certain novel features of construction and combinations of parts as hereinafter set forth and pointed out in the claim.

In the accompanying drawings, Figure 1 is a perspective view showing an embodiment of the invention; Figure 2 is a sectional view; Figure 3 is an enlarged transverse sectional view showing the connections of the central brace with the spring saddle, and Figure 4 is a view of a modification.

In Figure 1 of the drawing, is indicated, in dotted lines at 1, a spring saddle of an automobile and the rear spring is represented by dotted lines 2,—the tire carrier being shown at 3.

The body portion of the tire carrier may comprise a band or strap 4 having segmental form and a straight bar 5 connecting the ends of the segmental strap or band. Lugs 6—6 are located at respective ends of the bar 5 to receive the rim of a tire encircling the carrier.

The cross-bar 5 is made angular in cross section and has pivotally connected therewith a lever member 7 and to the lower end of this lever member, a lower lever member 8 is pivotally connected,—each of said lever members being made with angular cross-section and provided near their pivotal connection with each other, with holes 9 to receive the shackle of a lock.

The rear ends of flanged arms or braces 10—10 are secured to the segmental band or strap 4 diametrically opposite each other and the forward ends of these arms or braces are rigidly secured to the spring saddle 1. A central brace 11 (made angular in cross section) is provided between the lower central portion of the band or strap 4 and the central portion of the spring saddle 1. In effecting a rigid connection between the central brace 11 and the spring saddle 1, a plate 12 is employed and the body portion of this plate is rigidly fastened upon the front end portion of said brace 11. The plate 12 is provided with lateral arms 13 which are bent downwardly so as to underlie portions of the spring saddle at respective sides of the center thereof. Each lateral arm or wing 13 is provided with a slot or opening 14 through which one arm of a U-bolt 15 passes, said U-bolt embracing the spring saddle and its other arm passing through the cross-bar 16 of the shackle in rear of said lateral arm or wing. In this manner the central brace 11 is adjustably but rigidly secured to the central portion of the spring saddle.

The central brace 11 extends in an inclined direction from the spring saddle 1 to the lower central portion of the carrier band 4 and at its rear end is provided with an extension 17 which lies upon the inner face of the band 4 and is securely riveted thereto, while the side flanges of said brace 11 are bent or curved somewhat at their free rear ends and depend below the band of the carrier so as to provide a back stop 18 for the rim of a tire. The brace extension 17 is provided at its respective edges with upstanding lugs 18 between which, a link 20 is pivotally connected,—said link projecting rearwardly from its connection with the brace extension and provided with a shoulder 21 to engage the tire rim opposite the engagement therewith of the back stop flanges 18. The link 20 may be made angular in cross section and between its flanges, the lower end of the lever member 8 is pivotally connected near the free end of said link so that when the lever members 7 and 8 are brought to the position shown in Figures 1 and 2, the tire rim will be confined between the shoulder 21 and the back stop 18 and when the parts are in these positions, the lever members may be locked together as previously explained.

Instead of utilizing the central brace 11 to provide a back stop and instead of providing lugs 19 on said brace for attachment of the link 20, the construction in Figure 4 may be employed. In this modified construction, a plate 22 secured to the central portion of the band 4 of the carrier is provided with a projecting part to form a back stop 23 and with lugs 24, to which latter, the link 20 is pivoted. With such construction, the extension 17 of the central brace 11 is securely riveted or bolted on the plate 22.

Having fully described my invention what I claim as new and desire to secure by Letters-Patent, is:—

The combination with a tire carrier, of a brace having a rear extension secured to the tire carrier and provided with lugs, said brace being made angular in cross-section and the rear ends of its flanges forming a back-stop for a tire, lever members pivotally connected together, one of said lever members pivotally connected with the carrier, and a link having a shoulder, pivotally connected with the other lever member and pivotally connected with the lugs of the brace extension.

In testimony whereof, I have signed this specification.

THOMAS H. LYNN.